ant Office 3,352,886
Patented Nov. 14, 1967

3,352,886
MANUFACTURE OF CIS-1,2-CYCLOBUTANE-
CARBOXYLIC ANHYDRIDE
Janice L. Greene, Warrensville Heights, and Kathleen B.
Fuller, Tiffin, Ohio, assignors to The Standard Oil Company, Cleveland, Ohio, a corporation of Ohio
No Drawing. Filed Aug. 20, 1964, Ser. No. 391,033
10 Claims. (Cl. 260—346.3)

The present invention relates to the preparation of cis-1,2-cyclobutanecarboxylic anhydrides and more particularly pertains to the hydrolysis in the presence of an inert solvent of the cis- or trans-acid monohydrate adduct of 1,2-dicyanocyclobutanes.

The preferred process embodied herein may be represented by the following equation:

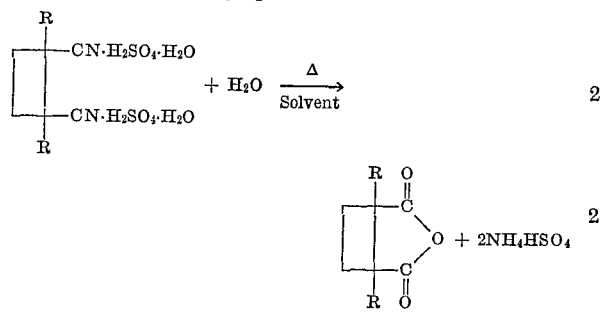

wherein the R groups may be the same or different and each R group represents hydrogen, a lower alkyl group or a halogen. The starting material for the foregoing reaction, the sulfuric acid or phosphoric acid monohydrate adduct of a cis- or trans-dicyanocyclobutane, is conveniently prepared by adding the proper amount of sulfuric acid monohydrate or phosphoric acid monohydrate to a cis- or trans-dicyanocyclobutane. The preparation of the sulfuric acid monohydrate adduct or cis- or trans-1,2-dicyanocyclobutane is more fully described in the copending U.S. patent application of Janice L. Greene and James D. Idol, Jr., Ser. No. 214,532, filed Aug. 3, 1962, now U.S. Patent No. 3,202,695.

The process of the present invention in its broader aspect can be represented by the following equation

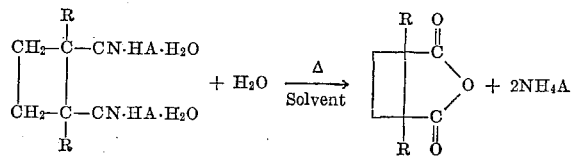

wherein R has the aforementioned designation and A represents $HSO_4^-$ or $H_2PO_4^-$. Preferred in the present process is the foregoing equation wherein R is hydrogen or methyl and in the most preferred reaction R is hydrogen.

In carrying out the present process, the sulfuric acid monohydrate and the cyclobutane-1,2-dicyanide, for instance, are mixed together or one added to the other at a temperature of from 40 to 125° C. for from 15 minutes to 4 hours, followed by cooling or permitting the reaction product to come to ambient temperature. The higher the reaction temperature in this reaction, the shorter the reaction time required; and conversely, the lower the reaction temperature, the longer the reaction time required. The reaction is exothermic and external cooling can be used if desired. Temperatures of from 50 to 95° C. are preferred, because higher temperatures may somewhat affect the stability of the cyclobutane ring. In the preparation of the adduct the relative molar amounts of the 1,2-dicyanocyclobutane and sulfuric acid monohydrate or phosphoric acid monohydrate are preferably 1:2 respectively, but an excess of either may be used. When an excess of either component is used in the formation of the adduct, the unreacted component will remain in the final product unless steps are taken to remove it.

It should be pointed out that the exact structure of the 1,2-dicyanocyclobutane-sulfuric acid monohydrate adduct is not known with certainty although it probably is one or more of the following structures:

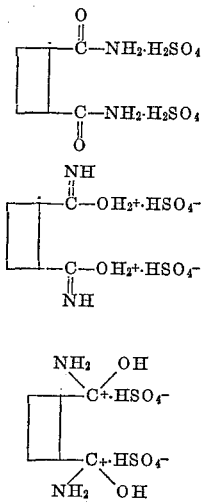

or

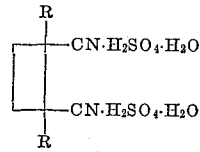

For convenience the sulfuric acid monohydrate adduct of the 1,2-dicyanocyclobutanes useful in this invention are considered to have the following structure:

$$\begin{array}{c} R \\ \hline \phantom{xx}-CN \cdot H_2SO_4 \cdot H_2O \\ \phantom{xx} \\ \phantom{xx}-CN \cdot H_2SO_4 \cdot H_2O \\ \hline R \end{array}$$

wherein R has the aforementioned designation.

The 1,2-dicyanocyclobutanes useful herein are conveniently prepared by the cyclization of one or more cyano monomers such as acrylonitrile, methacrylonitrile and alpha-halo acrylonitriles by known procedures.

The cis-1,2-cyclobutanedicarboxylic anhydrides are prepared by adding preferably one mole of water to each mole of the adduct in the presence of an inert solvent and heating the resulting mixture for from about 30 minutes up to about 100 hours.

Any inert solvent boiling in the range of 50° C. to 250° C. may be used in the hydrolysis step. The maximum boiling point of the solvent that can be satisfactorily employed is limited by the stability of the cyclobutane ring at the reflux temperature, and the minimum boiling point is limited by the rate of reaction. Examples of suitable solvents include, but are not limited to, acetonitrile, dimethyl formamide, dimethyl sulfoxide, acetone, dimethoxyethane, tetrahydrofuran, methyl ethyl ketone, dodecane, mesitylene and mixtures of one or more of these. Because the solvent is believed to serve merely as a heat transfer medium and not as a reactant, the amount and type are not critical. The only requirement for the solvent or liquid medium in the present reaction is that it be chemically inert toward the reactants. It is most preferred to have enough of the heat transfer medium present in the reaction mixture so as to form a manageable reaction mixture.

A convenient means for controlling the reaction temperature is to carry the reaction out at the reflux temperature of the inert solvent. Although temperatures ranging from 50 to 250° C. may be utilized, a reaction temperature between 150° and 175° C. is preferred.

The amount of water employed in the hydrolysis of the acid monohydrate adduct of the 1,2-dicyanocyclobutane is preferably that stoichiometrically required. Surprisingly, when an excess of water is used in the hydrolysis reaction embodied herein with the trans-adduct, the trans-dicarboxylic acid of the cyclobutane is obtained rather than the cis-dicarboxylic acid.

The preparation of cis-1,2-cyclobutanedicarboxylic anhydride by the reaction of trans-1,2-cyclobutanedicarboxylic acid with acetyl chloride has been described in an article by W. H. Perkin appearing in the Journal of the Chemical Society, 65, 582 (1894). Cis-1,2-cyclobutanedicarboxylic anhydride is useful as a curing agent for epoxy resins and it is also a useful ingredient in alkyd resins.

The process of this invention is further illustrated in the following examples wherein the amounts of ingredients are expressed as parts by weight unless otherwise indicated.

Example I

To a mixture of 102 g. of concentrated sulfuric acid and 14.5 g. of water (1.0 mole of $H_2SO_4 \cdot H_2O$) were added 53 g. of trans-1,2-dicyanocyclobutane (0.5 mole). After stirring the adduct for 0.5 hours, 9 g. of water (0.5 mole) mixed with 200 ml. of mesitylene were added. The resulting mixture was then refluxed (approximately 160° C.) for a period of 30 hours. After refluxing, the pot was cooled, the contents were filtered and the solid $NH_4HSO_4$ was washed with dimethoxyethane in which the anhydride is very soluble. The filtrates were combined, stripped and vacuum distilled. 59.5 g. of cis-1,2-cyclobutanedicarboxylic anhydride were obtained which is equivalent to a yield of 79%. The product was a white crystalline solid with a melting point of 76–78° C. and a boiling point of 148° C. at 14 mm. pressure. The cis-1,2-cyclobutanedicarboxylic anhydride was found to be slightly soluble in ether and water and soluble in alcohol, acetone, methyl ethyl ketone nad tetrahydrofuran.

Similar results were obtained starting with the phosphoric acid monohydrate adduct of trans-1,2-dicyanocyclobutane.

Example II

To one mole of the trans-1,2-dicyanocyclobutane sulfuric acid monohydrate adduct prepared as described in Example I were added one mole of water and 400 ml. of the designated solvent (see Table 1). The resulting mixture was then refluxed for the designated period of time. After cooling, the mixture was filtered to remove $NH_4HSO_4$, which was washed with a solvent such as acetone or dimethoxyethane. The washings were then combined with the filtrate and the resulting mixture was stripped of volatile material at reduced pressure followed by vacuum distillation. The identification of the cis-1,2-cyclobutanedicarboxylic acid anhydride was accomplished by infrared analysis. The results are given in Table 1.

TABLE 1

| Reaction Medium | Reflux Temp., °C. | Reflux Time, Hrs. | Percent Yield Anhydride |
|---|---|---|---|
| Dimethoxyethane | 64 | 16.5 | 26 |
| Tetrahydrofuran | 64–66 | 122 | 25 |
| Benzene | 80 | 17 | 35 |
| Isopropanol | 90 | 17 | 64 |
| Dimethyl Formamide | 153 | 23 | 55 |
| Mesitylene | 165 | 40 | 79 |
| Dimethyl Sulfoxide | 189 | 23 | 47 |
| Dodecane | 215 | 88 | 78 |

Similar results were obtained when acetone, methyl ethyl ketone and acetonitrile were used as the reaction media. Results similar to the above were obtained starting with 1,2-dicyano-1,2-dimehyl cyclobutane which is obtained by the cyclic dimerization of methacrylonitrile.

We claim:
1. The process for preparing a cis-1,2-cyclobutanedicarboxylic anhydride having the structure

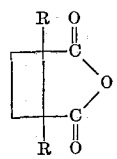

wherein R is a member selected from the group consisting of hydrogen, a lower alkyl group and a halogen comprising reacting a compound corresponding to the formula

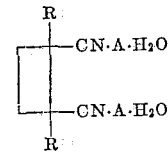

wherein R has the foregoing designation and A is a member selected from the group consisting of $HSO_4^-$ and $H_2PO_4^-$ with a substantially equimolar proportion of water.

2. The process of claim 1 carried out in the presence of an inert liquid diluent.
3. The process of claim 2 carried out at a temperature of from about 50 to 250° C.
4. The process of claim 3 wherein R is hydrogen and A is $HSO_4^-$.
5. The process of claim 4 wherein the inert liquid diluent is mesitylene.
6. The process of claim 4 wherein the inert liquid diluent is dodecane.
7. The process of claim 4 wherein the inert liquid diluent is isopropanol.
8. The process of claim 4 wherein the inert liquid diluent is dimethyl formamide.
9. The process of claim 4 wherein the inert liquid diluent is dimethyl sulfoxide.
10. The process of claim 4 wherein the inert liquid diluent is benzene.

References Cited

UNITED STATES PATENTS

| 2,166,556 | 7/1939 | Spence et al. | |
|---|---|---|---|
| 2,509,873 | 5/1950 | McAteer. | |
| 3,110,729 | 11/1963 | Greene et al. | 260—557 |
| 3,290,365 | 12/1966 | Greene | 260—514 |

OTHER REFERENCES

Coyner et al., "J. Am. Chem. Soc." vol. 72 (January 1949), pp. 324–326.

HENRY R. JILES, *Primary Examiner.*

R. BOYD, *Assistant Examiner.*